United States Patent
McCrink

[15] 3,695,432
[45] Oct. 3, 1972

[54] SEWERAGE DISPOSAL PROCESS AND APPARATUS

[72] Inventor: Edward J. McCrink, 75 E. Lake St., Northlake, Ill. 60164

[22] Filed: May 25, 1970

[21] Appl. No.: 40,159

[52] U.S. Cl. ..................210/67, 210/68, 210/152, 210/177, 210/182, 110/8 E, 219/300, 263/41
[51] Int. Cl. ................................................C02c 1/00
[58] Field of Search............210/173, 177, 182–183, 210/152, 67, 68; 110/8, 8 A, 8 E; 219/300; 263/41

[56] References Cited

UNITED STATES PATENTS

| | | |
|---|---|---|
| 3,327,855 | 6/1967 | Watson et al. .........210/152 X |
| 3,252,896 | 5/1966 | Albertson ...........210/152 UX |
| 3,105,136 | 9/1963 | Ashenfarb ................219/300 |
| 3,515,381 | 6/1970 | Foch.........................110/8 X |
| 2,974,800 | 3/1961 | Fleischmann............210/177 |
| 2,013,707 | 9/1935 | Williams....................219/300 |
| 3,508,505 | 4/1970 | Gatewood....................110/8 |
| 3,383,228 | 5/1968 | Rekate et al..................110/8 |
| 383,536 | 5/1888 | Newman....................219/300 |
| 3,422,205 | 1/1969 | Pisano et al..............263/41 X |
| 1,358,383 | 11/1920 | Metzger..................263/41 X |

Primary Examiner—Reuben Friedman
Assistant Examiner—Frederick F. Calvetti
Attorney—Olson, Trexler, Wolters & Bushnell

[57] ABSTRACT

Liquid and solid organic wastes are separated by a settling process. The solid waste materials, while still wet or damp, are pumped into a heating retort along with an exothermic atmosphere such as dissociated ammonia, methane, propane, etc., and are heated to a very high temperature by electric resistance heating. This reduces the solid material to a very small amount of powdery ash. Gases from the process are passed through a flame curtain to avoid all odors.

6 Claims, 1 Drawing Figure

PATENTED OCT 3 1972
3,695,432
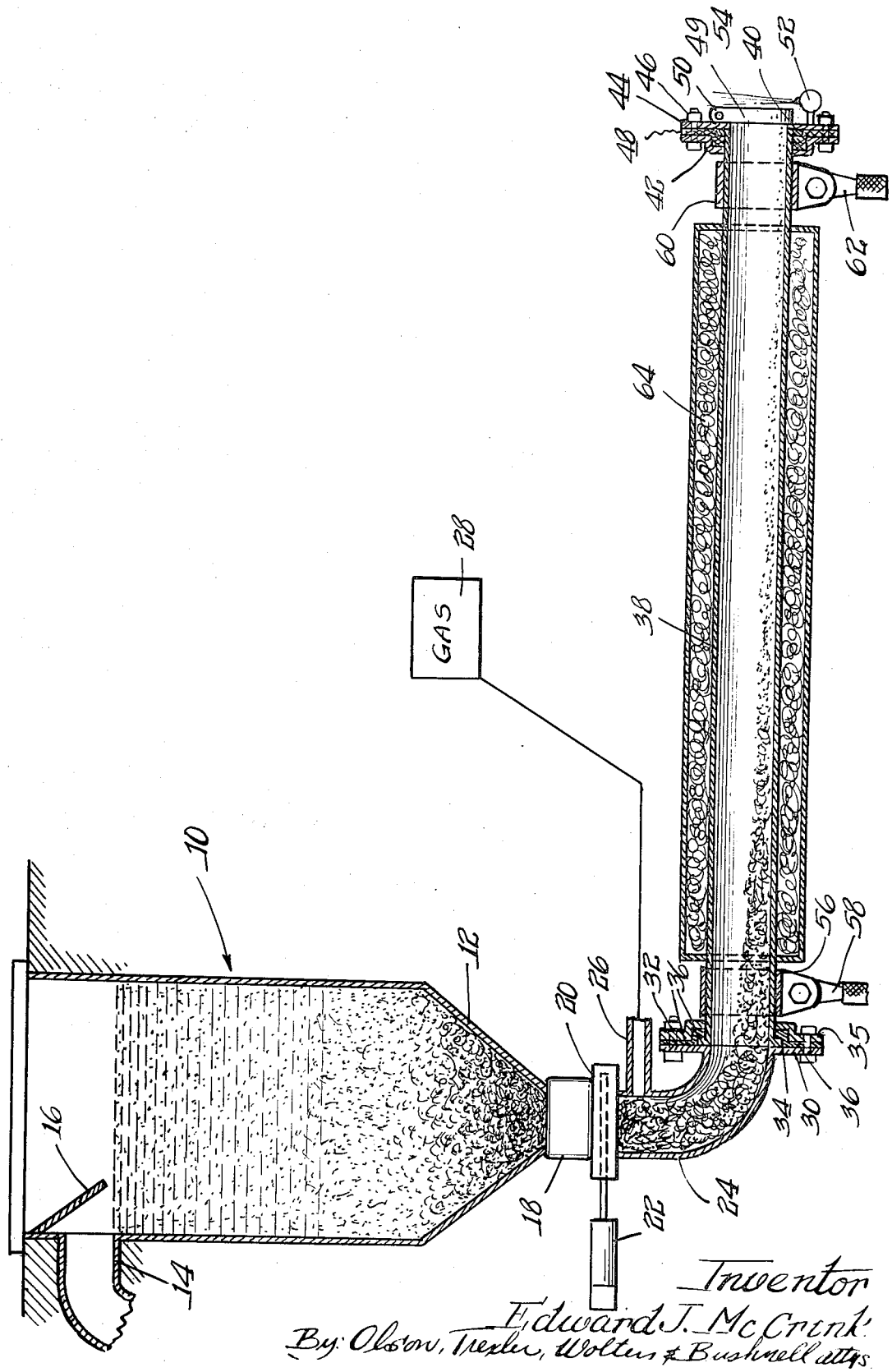
Inventor
Edward J. McCrink
By Olson, Trexler, Wolters & Bushnell attys

SEWERAGE DISPOSAL PROCESS AND APPARATUS

BACKGROUND OF THE INVENTION

As is well recognized, disposal of organic sewerage and other waste products is becoming an ever increasing problem for civilized man. In addition to disposing of large amounts of sewerage, as in a municipal sewerage disposal plant, it has also become necessary to provide for disposal of sewerage from boats and ships. At one time, sewerage and other materials were simply dumped from boats and ships into the water, but with increasing population densities, and increasing use of boats and ships, this has proved to be unacceptable.

OBJECTS AND BRIEF DESCRIPTION

In view of the foregoing, it is an object of the present invention to provide means for separating solid organic components from liquid organic components in sewerage, and for reducing the solid components to a small amount of powdery ash, without the release of any noxious or otherwise objectionable gases or odors.

Specifically, it is an object of the present invention to subject solid organic waste materials to a very high temperature in a nonoxidizing atmosphere to reduce the solid materials to a very small amount of powdery ash.

The objects of the present invention are realized by pumping sewerage into a settling tank, and allowing the solid materials to sink to the bottom with the liquid overflowing. From time-to-time the solid materials collected at the bottom of the settling tank are pumped along with an inert atmosphere into a conduit comprising an electric resistance heating element which heats the material to a very high temperature. This completely dries it, and also dissociates it to a significant degree. Gases which are driven off pass through a flame curtain, whereby odors and any noxious products are burned, while the remaining solid material exit from the conduit as a relatively small amount of unobjectionable, powdered ash.

THE DRAWINGS AND DETAILED DESCRIPTION

In the single figure of the drawing, there is a somewhat schematic representation of apparatus embodying the present invention.

As shown therein, there is a settling tank 10 of a generally vertical cylindrical nature, and having a funnel-like or frustoconical lower portion 12. The top may be open, or it may be provided with a lid having a pipe or entrance thereinto, and an overflow conduit 14 is provided for liquid effluent material to overflow. A diagonally downward baffle 16 prevents any material dumped into the tank from passing directly out through the conduit 14.

At the bottom of the tank 10 there is a pump 18 which may be driven by means such as an electric motor. An automatic valve unit 20 underlies the pump, and when closed this valve unit prevents materials from leaking through. A control 22 is provided for the pump and valve unit, and this may be manually operated, or it may be automatic, being set on a time basis, or on a basis of the amount of material dumped into the tank, or on a basis of the solid material accumulated in the tank, which latter can be engaged by means such as a light and photo cell combination. In any event, from time-to-time the pump is operated and the valve unit is opened whereby the semi-solid or wet solid materials at the bottom of the tank are pumped straight down therefrom into an elbow 24 having an atmosphere feed line 26 opening thereinto, the latter being connected to a gas supply source 28. The gas source is non-oxidizing, and may comprise dissociated ammonia, methane, propane, etc.

The elbow is provided at its exit end with a circumferential, radially extending flange 30. Bolts 32 having nuts thereon pass through the flange 30 and also through a clamping washer 34 to clamp a relatively smaller circumferential, radially extending flange 35 against the flange 30. Asbestos or other heat resistant gaskets 36 are provided to insure air and liquid tightness.

The flange 35 is integral with an elongated cylinder or tube 38 made of silicon carbide, which will be recognized as an electric resistance heating material. A flange 40 is provided at the outlet end, similar to the flange 35. This flange acts through a suitable clamp washer 42 and flange 44 secured thereto by nuts and bolts 46, suitable asbestos or the like gaskets 48 again being provided, to support a closure or door 49 pivoted or hinged at the top as indicated at 50. The flange or plate 44 may also support a burner 52 providing an upwardly directed flame curtain 54 across the exit end of the conduit, whereby to burn any escaping gases, thereby to avoid odors. As will be understood, the burner 52 may be supported independently, if so desired.

A clamp 56 encircles the inlet end of the tube 38 and connects an electric cable 58 thereto. Similarly, a clamp 60 encircles the outlet end of the pipe or tube, having a cable 62 connected thereto. Exterior insulation 64 on the tube intermediate the clamps limits loss of heat from the walls of the tube. As will be appreciated, the cables 58 and 62 are connected to the opposite terminals of a power source, such as a motor driven generator or alternator. Preferably conventional means are incorporated for adjusting the amount of current flowing through the tube 38, whereby to adjust the temperature thereof. As will be appreciated, the tube can be heated to several hundred degrees Fahrenheit.

In summary of the operation, mixed liquid and solid sewerage materials are dumped into the settling tank 10 with liquid effluent overflowing the outlet conduit 14. From time-to-time the pump 18 and valve unit 20 are operated to pump the more or less solid materials down through the elbow 24 into the tube 38 where they are heated to a very high temperature. The moisture remaining is driven off as highly heated water vapor. The gas pumped in under pressure from the source 28 prevents oxidation of the material in the tube 38, whereby the solid material is reduced to a very fine, powdered ash. Gases exit from the exit end of the tube, and must pass through the flame curtain 54, whereby any odors are burned and eliminated. As it will be appreciated, the door 49 is not completely sealed closed, whereby gases may leak out around it. Alternatively, it may be provided with limited area openings to allow egress of gas. Since the reducing atmosphere gas may be of a combustable nature, it will be appreciated that not too much gas is needed from the burner 52 to produce the flame curtain 54, since the curtain will be augmented by burnable gases exiting from the tube. The entering material may force the ash out the discharge or exit end of the tube, or, if desired, a screw-type conveyor may be provided, although the latter is generally not needed. In an actual test twenty pounds of dog feces were reduced to a few ounces of slightly sweet smelling ash.

A specific example of the invention as herein shown and described is for illustrative purposes only. Various changes in structure will not doubt occur to those skilled in the art, and will be understood as forming a part of the present invention insofar as they fall within the spirit and scope of the appended claims.

The invention is claimed as follows:

1. The process of disposing of sewerage which comprises the steps of settling and separating liquid and solid organic waste materials, transferring the separated solid waste materials to a heat treating station, heating said solid organic waste materials in a non-oxidizing atmosphere to the point of destructive distillation, treating gaseous products given off during such distillation, and removing resulting ash from said heating station.

2. Sewerage disposal apparatus comprising a settling tank for receiving mixed liquid and solid organic waste materials, overflow means for discharging liquid waste materials from said tank, a conduit having means for heating thereof exteriorly of the interior of said conduit, means for transporting solid waste materials from said tank to said conduit, means for introducing a non-oxidizing atmosphere into said conduit with said solid waste materials, said heating means and conduit being constructed and arranged to heat waste materials in said conduit to the point of destructive distillation free of oxidation, means for discharging resulting ash from said conduit, and means for treating gaseous products from said waste materials.

3. Apparatus as set forth in claim 2 wherein the tank is disposed above the conduit and the transporting means comprises a pump and valve unit at the bottom of said tank.

4. Apparatus as set forth in claim 2 wherein said conduit is formed of an electric resistance heating material.

5. Apparatus as set forth in claim 4 wherein said material comprises silicon carbide.

6. Apparatus as set forth in claim 2 wherein said conduit is formed of a refractory material.

* * * * *